United States Patent Office 3,642,717
Patented Feb. 15, 1972

3,642,717
COPOLYMERS OF β-LACTONES AND
N-PHENETHYLAZIRIDINES
Laurence I. Peterson, Framingham, Mass., and Louisa J. Sauro, Midland, Mich., assignors to The Dow Chemical Company, Midland, Mich.
No Drawing. Filed Dec. 30, 1968, Ser. No. 787,993
Int. Cl. C08g 20/00, 33/02
U.S. Cl. 260—78.3                                    5 Claims

ABSTRACT OF THE DISCLOSURE

Novel copolymers are prepared in the reaction between (a) β-propiolactone, β-isobutyrolactone or β-neopentanolactone and (b) an N-phenethylaziridine of the formula

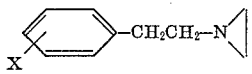

wherein X is hydrogen, halogen, cyano, or alkyl, aryl or aralkyl having 1 to about 10 carbon atoms. The copolymers are useful as antioxidants and cure rate accelerators in elastomer compositions.

BACKGROUND OF THE INVENTION

The copolymerization between β-propiolactone and ethylenimine, i.e., aziridine, is taught in U.S. Pat. 3,375,-231 and J. Polymer Sci., Part B, 3, 617 (1965).

The copolymers described in the first reference comprise a plurality of ring-open units of β-propiolactone and aziridine joined via amide and ether linkages. The latter reference describes the effect of various solvents on the prior reaction.

The copolymerization reaction between N-(2-cyanoethyl)aziridine and β-lactones is described in our copending application entitled: "Copolymers of N-(2-Cyanoethyl)Aziridines and β-Lactones," filed concurrently herewith.

SUMMARY OF THE INVENTION

It has now been discovered that novel copolymers comprising ring-opened units of (a) β-propiolactone, β-isobutyrolactone or β-neopentanolactone, and (b) an N-phenethylaziridine having the formula

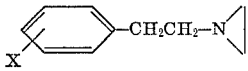

wherein X is hydrogen, halogen, cyano, or alkyl, aryl or aralkyl having 1 to about 10 carbon atoms, are produced in the novel reaction between the β-lactones and N-substituted aziridines indicated by (a) and (b) above, at a temperature between about —20° C. and 100° C. in an inert solvent medium. The subject copolymers are particularly useful as antioxidants and cure rate accelerators in elastomer compositions.

The novel copolymers comprise a plurality of the ring-opened units of β-lactone and N-phenethylaziridine joined via amino and ester linkages. The backbone of the copolymer is a random mixture of such ring-opened units.

The fact that the ring-opened units of the subject copolymer were joined through amino and ester linkages was most surprising in view of the prior art teachings, which had taught amide and ether linkages for polymers or seemingly similar materials. Accordingly, the subject copolymers have unexpectedly different physical properties, such as solubility and reactivity.

Suitable reactants in the novel process of preparing the subject copolymers include (a) β-propiolactone, β-isobutyrolactone or β-neopentanolactone, and (b) an N-phenethylaziridine having the formula

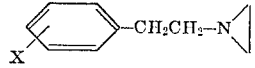

wherein X is hydrogen, halogen, cyano, or alkyl, cycloalkyl, aryl or aralkyl having 1 to about 10 carbon atoms. The preferred reactants in (b) are those wherein X is hydrogen, alkyl, aryl or aralkyl, and the most preferred reactant is N-phenethylaziridine, wherein X is hydrogen. Any of the substituents designated by X may be in any position (o, m or p) on the benzene ring.

Examples of suitable N-phenethylaziridine reactants include: N-phenethylaziridine, i.e. N-(2-phenylethyl)aziridine, hereinafter PEAz, o- or p-methylPEAz, o- or p-ethyl-PEAz, p-t-butylPEAz, o- or p-n-octylPEAz, p-cyclohexyl-PEAz, o- or p-chloroPEAz, o- or p-bromoPEAz, o- or p-iodoPEAz, m-cyanoPEAz, p-naphthylPEAz, phenyl-PEAz, p-benzylPEAz, p-phenylethylPEAz and o-phenylbutylPEAz, and other like compounds.

The reaction is conducted in an inert solvent, i.e. a solvent which does not react with either the β-lactone or aziridinyl reactants or the copolymer produced. Unlike the prior art teachings, the subject copolymer is formed independent of the dielectric constant of the solvent. Accordingly, suitable solvents include aromatic or alkaromatic, ethers, ketones, and nitriles. Examples of suitable solvents include benzene, toluene, xylene, acetonitrile, dichloroethylene, diethyl ether, tetrahydrofuran and acetone. The preferred solvent is acetonitrile.

The reaction temperature is ordinarily between about —20° C. and about 100° C. At temperatures below —20° C., the reaction rate is quite low, and above 100° C., the β-propiolactone homopolymerizes.

While any molar proportion of reactants is suitable, a ratio between about 1:20 and 20:1 of β-lactone:N-phenethylaziridine is generally preferred, and a ratio between about 1:2 and 2:1 is most preferred.

The copolymers are useful as antioxidants in vulcanizable elastomer compositions which comprise at least one of styrene-butadiene rubber, butadiene rubber, natural rubber and isoprene rubber. The need for non-staining antioxidants in such elastomeric compositions is well recognized in the rubber industry to protect the rubber product from oxidative degradation which produces an undesirable surface appearance, due to cracking or crazing, and also lowers the elasticity of the product. One standard measure of the latter effect is to record the modulus, tensile and elongation (MTE), in accordance with ASTM D412–66, of unaged and aged (in oxygen or air at an elevated temperature) vulcanized compositions and to compare the numerical differences. A small change upon aging indicates an effective antioxidant.

Vulcanizable elastomer compositions, as defined above, which include an antioxidizing amount of the subject copolymers are novel compositions which are shaped and thermally cured under pressure into useful products, such as tires.

The subject copolymers are also important in said elastomer compositions as cure rate accelerators. The vulcanization process in rubber, i.e. cross-linking through sulfur atoms and points of ethylenic unsaturation in two polymer chains, is generally accomplished by blending sulfur and an accelerator into the elastomer composition and then thermally curing the mixture under pressure. The subject copolymers act both as an accelerator and antioxidant and therefore yield a dual advantage to the rubber compounder. Elastomer compositions containing an accelerating amount of the subject copolymers are novel compositions.

The copolymers are suitably used in amounts between about 0.5 and about 10 parts by weight per 100 parts by weight of elastomer.

SPECIFIC EMBODIMENTS

The following examples further illustrate the invention:

COPOLYMER PREPARATION

A solution of N-(2-phenylethyl)aziridine (58.8 g., 0.4 mole) in 100 ml. of acetonitrile was added dropwise with stirring to a solution of β-propiolactone (28.8 g., 0.4 mole) in 200 ml. of acetonitrile at a temperature between 0°–7° C. A colorless and transparent two-phase system formed. Stirring of the mixture was continued for 1 hr. at 0° C., overnight (about 16 hrs.) at room temperature, and 2 hrs. at 50° C. The reaction mixture was then refluxed at 92° C. for 2 hrs. under a nitrogen blanket. The two layers were physically separated and the volatile components removed from each solution by warming under reduced pressure (20 mm. and 50–60° C.). The bottom layer and top layer yielded 53 g. and 32 g., respectively, and a yellow, gummy polymer.

The product was analyzed by means of infrared, nmr, microanalysis and gel permeation chromatography.

*Analysis.*—Calcd. for $C_{13}H_{17}O_2N$ (percent): C, 71.19; H, 7.83; N, 6.39 (mol. wt. 219). Found (percent): C, 70.7; H, 8.16; N, 5.9 (mol. wt. 1000).

The above copolymer was tested as an antioxidant in a standard styrene-butadiene rubber (SBR) base composition which was compounded according to ASTM D15–66T. The test formulation contained the following ingredients:

TEST FORMULATION

| Ingredient: | Parts, by wt. |
|---|---|
| SBR 1609 | 145.0 |
| Stearic acid | 1.0 |
| Zinc oxide | 4.0 |
| Paraffin waxes | 3.5 |
| Sulfur | 2.0 |
| N-t-butyl-2-benzothiazolesulfonamide | 1.2 |
| Antioxidant (above copolymer) | 4.5 |

SBR 1609 is a commercially available product. The averaged results of testing unaged samples of the test formulation cured at 320° F. in accordance with ASTM D412–66 were as follows:

PHYSICAL PROPERTIES OF UNAGED MATERIALS

| Cure time, min. | Elongation, percent | 300% modulus, p.s.i. | Tensile, p.s.i. | Hardness, Shore |
|---|---|---|---|---|
| 10 | 540 | 1,100 | 3,300 | 54 |
| 20 | 530 | 1,180 | 3,390 | 56 |
| 30 | 520 | 1,210 | 3,230 | 58 |

The standard base composition, i.e. without the subject copolymer, when cured 20 min. at 320° F. has about the same physical properties as the subject formulation (copolymer included) does in 10 min. Accordingly, the copolymer is a cure rate accelerator.

The results of tests on samples of the above test formulation which were cured 20 min. at 320° F. and then aged 24 hrs. at 158° F. in an oxygen bomb at 300 p.s.i. pursuant to ASTM D572–67 were as follows:

PHYSICAL PROPERTIES OF AGED MATERIALS

Elongation—510 percent
300% modulus—1200 p.s.i.
Tensile—3360 p.s.i.
Hardness—64

Under similar conditions, samples of the standard base composition are more seriously degraded.

In addition to the above tests, a staining test according to ASTM D925–63 showed that the copolymer was a non-staining, non-migratory antioxidant. Accordingly, the antioxidant can be used in light-colored stocks and in elastomer backings for such stocks.

We claim:
1. A copolymer whose backbone consists essentially of ring-opened units of (a) β-propiolactone, β-isobutyrolactone or β-neopentanolactone, and (b) an N-phenethylaziridine having the formula

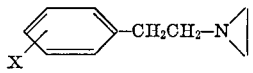

wherein X is hydrogen, halogen, cyano, or alkyl, aryl or aralkyl having 1 to 10 carbon atoms.

2. The copolymer defined in claim 1 wherein the molar ratio of (a):(b) is between 1:20 and 20:1.
3. The copolymer defined in claim 2 wherein the molar ratio of (a):(b) is between 1:2 and 2:1.
4. The copolymer defined in claim 2 wherien X is hydrogen.
5. The copolymer defined in claim 3 wherein X is hydrogen.

References Cited

UNITED STATES PATENTS 3,355,437  11/1967  Tesoro et al. _____ 260—77.5
3,375,231   3/1968  Fukui et al. _____ 260—78.3

WILLIAM H. SHORT, Primary Examiner
E. A. NIELSEN, Assistant Examiner

U.S. Cl. X.R.

260—2 EN; 3 R; 45.9; 482 R; 561 B; 887